(12) United States Patent
Kirsch et al.

(10) Patent No.: US 8,396,145 B2
(45) Date of Patent: Mar. 12, 2013

(54) METHOD AND DEVICE FOR NOTCHING THE TRANSMISSION BAND OF AN ANALOG SIGNAL, IN PARTICULAR FOR A DETECT AND AVOID (DAA) OPERATION MODE OF AN MB-OFDM SYSTEM

(75) Inventors: Miguel Kirsch, Conches (CH); Régis Cattenoz, Annemasse (FR); Stéphane Tanrikulu, Annemasse (FR); Chiara Martinelli-Cattaneo, Sergy (FR)

(73) Assignee: STMicroelectronics N.V., Amsterdam (NL)

( * ) Notice: Subject to any disclaimer, the term of this patent is extended or adjusted under 35 U.S.C. 154(b) by 924 days.

(21) Appl. No.: 12/474,403

(22) Filed: May 29, 2009

(65) Prior Publication Data

US 2009/0296784 A1 Dec. 3, 2009

(30) Foreign Application Priority Data

May 30, 2008 (EP) .................................. 08157289

(51) Int. Cl.
*H04K 1/10* (2006.01)
(52) U.S. Cl. .......................................................... 375/260
(58) Field of Classification Search .................. None
See application file for complete search history.

(56) References Cited

U.S. PATENT DOCUMENTS

| | | | | |
|---|---|---|---|---|
| 2005/0232182 | A1* | 10/2005 | Shattil | 370/319 |
| 2006/0120473 | A1* | 6/2006 | Baum | 375/260 |
| 2006/0188003 | A1* | 8/2006 | Larsson | 375/130 |
| 2007/0004465 | A1* | 1/2007 | Papasakellariou et al. | 455/571 |
| 2008/0101497 | A1* | 5/2008 | Gaikwad et al. | 375/267 |

FOREIGN PATENT DOCUMENTS

| | | |
|---|---|---|
| EP | 1 802 063 | 12/2005 |
| EP | 1 914 907 | 10/2006 |

OTHER PUBLICATIONS

Mishra, et al. *Detect and Avoid: An Ultra-Wideband/WiMAX Coexistence Mechanism*: IEEE Communications Magazine; vol. 45. No. 6, Jun. 1, 2007 pp. 68-75.

Wang, et a. *Novel OFDM Transceiver with Time-Domain Scrambling*: Global Telecommunications Conference, Nov. 29-Dec. 3, 2004 Piscataway NJ; IEEE Communications Society; vol. 6, Nov. 29, 2004 pp. 2984-3988.

* cited by examiner

*Primary Examiner* — Daniel Washburn
*Assistant Examiner* — Wednel Cadeau
(74) *Attorney, Agent, or Firm* — Allen, Dyer, Doppelt, Milbrath & Gilchrist, P.A.

(57) ABSTRACT

A transmission band of an analog signal including successive symbols to be transmitted is notched, where each symbol includes sub-carriers to be modulated. In particular, in each symbol the sub-carriers corresponding to a part of the transmission band to be notched are suppressed. In addition, in each symbol a chosen part of the remaining sub-carriers to be modulated is also suppressed.

22 Claims, 9 Drawing Sheets

METHOD AND DEVICE FOR NOTCHING THE TRANSMISSION BAND OF AN ANALOG SIGNAL, IN PARTICULAR FOR A DETECT AND AVOID (DAA) OPERATION MODE OF AN MB-OFDM SYSTEM

FIELD OF THE INVENTION

The invention relates to wireless communication systems, especially to level attenuation within a given transmission band, and more particularly, to a Detect And Avoid (DAA) operation mode within an Ultra Wide Band (UWB) communication apparatus. A non-limiting application is directed to an apparatus operating according to the Ultra Wide Band (UWB) standard based on a multiband Orthogonal Frequency-Division Multiplexing (MB-OFDM) modulation scheme.

BACKGROUND OF THE INVENTION

An MB-OFDM apparatus, also called a WiMedia UWB apparatus, can generate interferences towards other wireless systems, and particularly a WIMAX device that is a fixed wireless device (Worldwide Interoperability for Microwave Access). Such a WIMAX device operates, for example, with a bandwidth of 20 MHz at a central frequency of 3.5 GHz, whereas the frequency band of the MB-OFDM system lies between 3.1 and 10.6 GHz.

Wireless personal area networks based on OFDM and UWB technologies, like the MB-OFDM standard, will directly interfere with narrowband interferers that are close to such wide band devices. At present, no specific interference mitigation techniques are implemented in the UWB standard based on OFDM.

Orthogonal frequency-Division Multiplexing (OFDM) is a digital modulation method in which a signal is split into several narrowband channels (sub-carriers) at different frequencies. To avoid in-band spectral interference, a given attenuation level may be reached within a given transmission band of the interfering signal.

For example, one method is based on modulating (or zeroing) the transmitted sub-carriers located within the given transmission band in order to try to cancel the signal energy found in this given band.

However, because of the amplitudes of side lobes of the remaining transmitted sub-carriers (these side lobes are produced by the sin(x)/x shape spectrum of each transmitted sub-carrier), it is generally difficult to reach relatively high attenuation levels within a given band of the transmitted OFDM symbol.

In particular, in the coexistence perspective of MB-OFDM systems with other wireless systems, and particularly with WiMax, notches of as much as −30 dB with respect to the OFDM sub-carriers transmission power are requested.

Another type of method for obtaining relatively high attenuation levels within a given band of a transmitted signal is disclosed in "Active Interference Cancellation Technique for MB-OFDM Cognitive Radio," Hirohisa Yamaguchi, 34th European Microwave Conference—Amsterdam, 2004. More precisely, according to this method, the band between sub-carriers $s_1$ and $s_2$ of an OFDM symbol is notched by 1) zeroing every sub-carrier between $s_1$ and $s_2$, and 2) modulating sub-carriers $s_1$ and $s_2$ using coefficients computed as a function of the OFDM symbol transmitted data, with the target of minimizing the energy in the band $s_1$-$s_2$. However, such a method is relatively complicated to implement.

Another method for removing sub-carriers within part of a transmission band to be notched is disclosed in European Patent No. 1,802,063 and is based, in particular, on filtering (either in frequency or time domain) the digital initial modulation signal with a frequency resolution higher than that of the initial modulation signal.

SUMMARY OF THE INVENTION

In view of the foregoing background, it is therefore an object of the present invention to provide mitigation techniques for wireless personal area networks based on OFDM and UWB technologies, like the MB-OFDM standard.

This and other objects, features, and advantages in accordance with the present invention are provided by a method and device that are based on dropping some other chosen sub-carriers, different from those already removed and corresponding to the part of the transmission band to be notched, while keeping the orthogonality between the remaining sub-carriers to be transmitted. This may advantageously give some spectrum-shaping flexibility over the remaining sub-carriers to increase the attenuation of their side-lobes.

The method of notching the transmission band of an analog signal may include successive symbols to be transmitted, with each symbol comprising sub-carriers to be modulated. The method may comprise suppressing in each symbol the sub-carriers corresponding to the part of the transmission band to be notched.

According to a general feature of this aspect, the method may further comprise suppressing in each symbol a chosen part of the remaining sub-carriers to be modulated. Thus, this further removal of a chosen part of the remaining sub-carriers to be transmitted already permits cancellation of the side-lobes of these further suppressed sub-carriers and thus, a supplemental attenuation level within the notch of the transmission band. This further removal of a chosen part of the remaining sub-carriers does not modify the orthogonality of the sub-carriers that are to be finally actually transmitted.

To avoid losing too much information, suppressing in each symbol a chosen part of the remaining sub-carriers to be modulated may comprise keeping in each symbol one remaining sub-carrier every n remaining sub-carriers, and suppressing all the other remaining sub-carriers of the symbol. One skilled in the art will be able to choose the value of n depending on the application and the constraints on the loss of information. However, it is advantageous to choose n<5.

For example, suppressing in each symbol a chosen part of the remaining sub-carriers to be modulated may comprise suppressing in each symbol half of the remaining sub-carriers. Suppressing only half of the remaining sub-carriers permits a reduction in an efficient way the loss of information. Suppressing in each symbol half of the remaining sub-carriers may comprise suppressing in each symbol every other remaining sub-carrier (n=2).

Such an embodiment permits preservation of a certain homogeneity within the symbol, and a further reduction in the loss of information. It is particularly advantageous for a transmission using time-domain spreading, to alternately suppress even and odd remaining sub-carriers, respectively in two successive symbols. It is thus possible to recover the lost sub-carriers.

To obtain a deeper notch, it may be advantageous to further multiply in the time-domain, the symbols by a windowing mask configured to keep the orthogonality between the sub-carriers to be transmitted and to decrease the side-lobes power of the sub-carriers to be transmitted.

For example, when one remaining sub-carrier every n remaining sub-carriers is kept in each symbol, elaborating the windowing mask may comprise providing a time-domain rectangle mask having a length equal to one $n^{th}$ of the length of a symbol; zero-padding the time domain rectangle mask to reach an initial time domain mask having a length equal to the length of a symbol; performing a time-domain to frequency-domain conversion processing of the initial time domain mask for obtaining a frequency-domain resulting mask; multiplying the resulting mask with a Gaussian function for obtaining a modified mask; and performing a frequency-domain to time-domain conversion processing on the modified mask for obtaining the windowing mask.

The windowing mask may preferably be elaborated from a rectangle mask and an auxiliary function, such as a Gaussian function, for example. The signal may be an UWB signal modulated according to an MB-OFDM modulation scheme.

According to another aspect, a device for notching the transmission band of an analog signal including successive symbols to be transmitted, with each symbol comprising sub-carriers to be modulated, is provided. The device may comprise processing means or a processor configured to suppress in each symbol the sub-carriers corresponding to the part of the transmission band to be notched. The device may be further configured to suppress in each symbol a chosen part of the remaining sub-carriers to be modulated.

The processor may be configured to keep in each symbol one remaining sub-carrier every n remaining sub-carriers, with n being an integer smaller than five, and to suppress all the other remaining sub-carriers of the symbol.

The processor may be configured to suppress in each symbol half of the remaining sub-carriers. The processor may be configured to suppress every other remaining sub-carrier. The processor may be configured to suppress, alternately, even and odd remaining sub-carriers respectively in two successive symbols.

The device may further comprise windowing means or circuit including a memory containing mask coefficients of a windowing mask configured to keep the orthogonality of the sub-carriers to be transmitted and to decrease the side-lobe power of the sub-carriers to be transmitted. The windowing circuit may comprise multiplying means or a multiplier configured to multiply in the time domain the symbols by the mask coefficients.

According to another aspect, a transmitter comprising a device as defined above may be provided. The transmitter may, for example, be part of an MB-OFDM system.

BRIEF DESCRIPTION OF THE DRAWINGS

Other advantages and features of the invention will appear on examining the detailed description of embodiments, these being in no way limiting, and of the appended drawings, in which.

DETAILED DESCRIPTION OF THE PREFERRED EMBODIMENTS

The invention will be now described in relation to MB-OFDM systems, although the invention is not limited to this particular application. Conventionally, a MB-OFDM digital baseband symbol is composed of 128 sub-carriers (corresponding to data, pilots, etc.). The transmitted data is generated by computing the IFFT (Inverse Fast Fourier Transform) of 128 frequency domain digital baseband samples, and padding the result with 37 zeroed samples. The whole symbol (165 samples) has a duration of 312.5 ns.

Most of the zero samples are used to cope with multipath channels, and some of them are used to give enough time to the radio subsystem for an eventual band switch (in TFI mode) between consecutive symbols.

Figure 1:
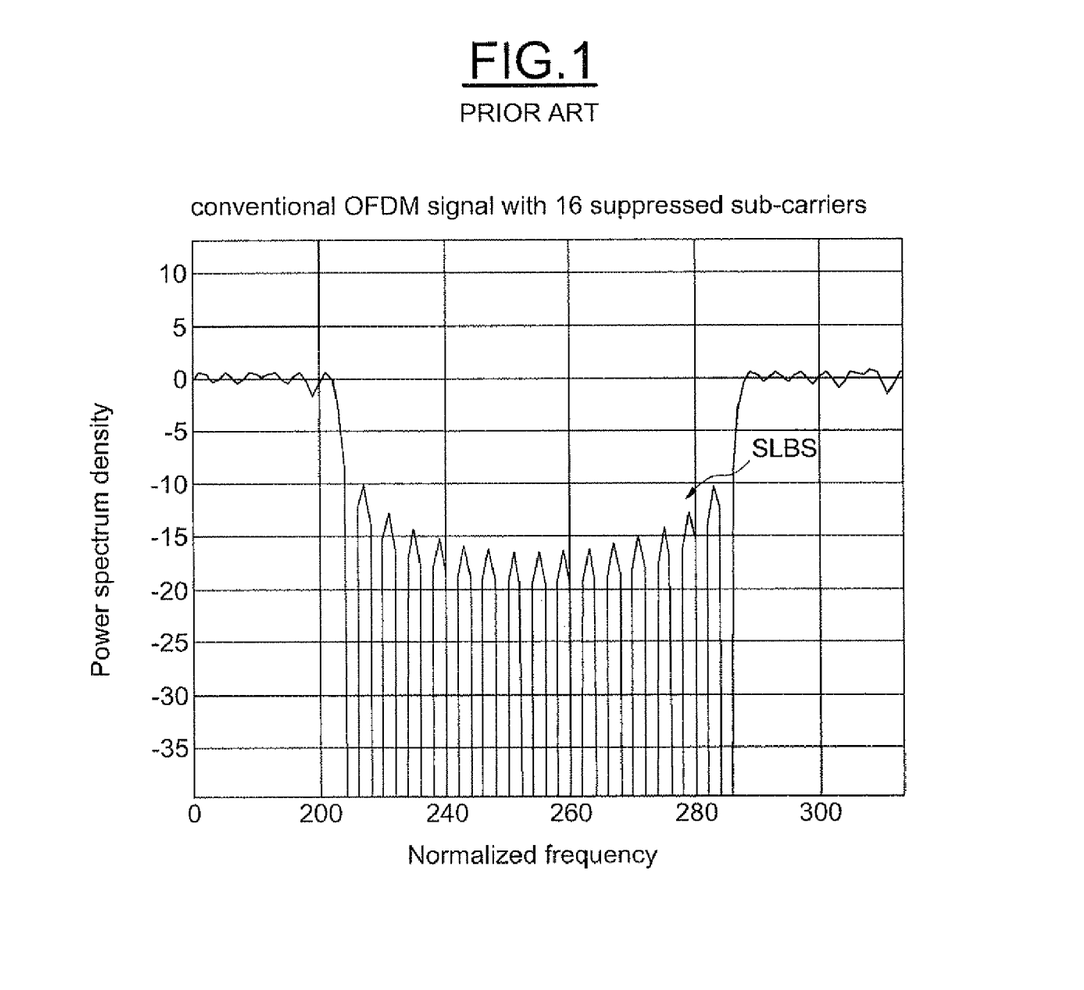
FIG. 1 is a graph illustrating an example of an OFDM symbol power spectrum density with 16 suppressed sub-carriers according to the prior art.

An example of an OFDM symbol power spectrum density with 16 suppressed sub-carriers (the 16 removed sub-carriers are conventionally modulated by coefficients set to zero) is depicted in FIG. 1. It can be seen that despite the suppressed sub-carriers, the secondary lobes SLBS produced by the sin c shape spectrum of each transmitted sub-carrier (i.e., the sub-carriers that have not been removed) are only below −10 dB. This does not comply with a notching mask set at −30 dB, as may be requested in the context of MB-OFDM transmission schemes.

In other words, the power of the side-lobes from the transmitted neighbor sub-carriers decreases too slowly to guarantee high power attenuations, for example, on the order of 30 dB, within the band to be notched, as requested by the MB-OFDM transmission.

Figure 2:
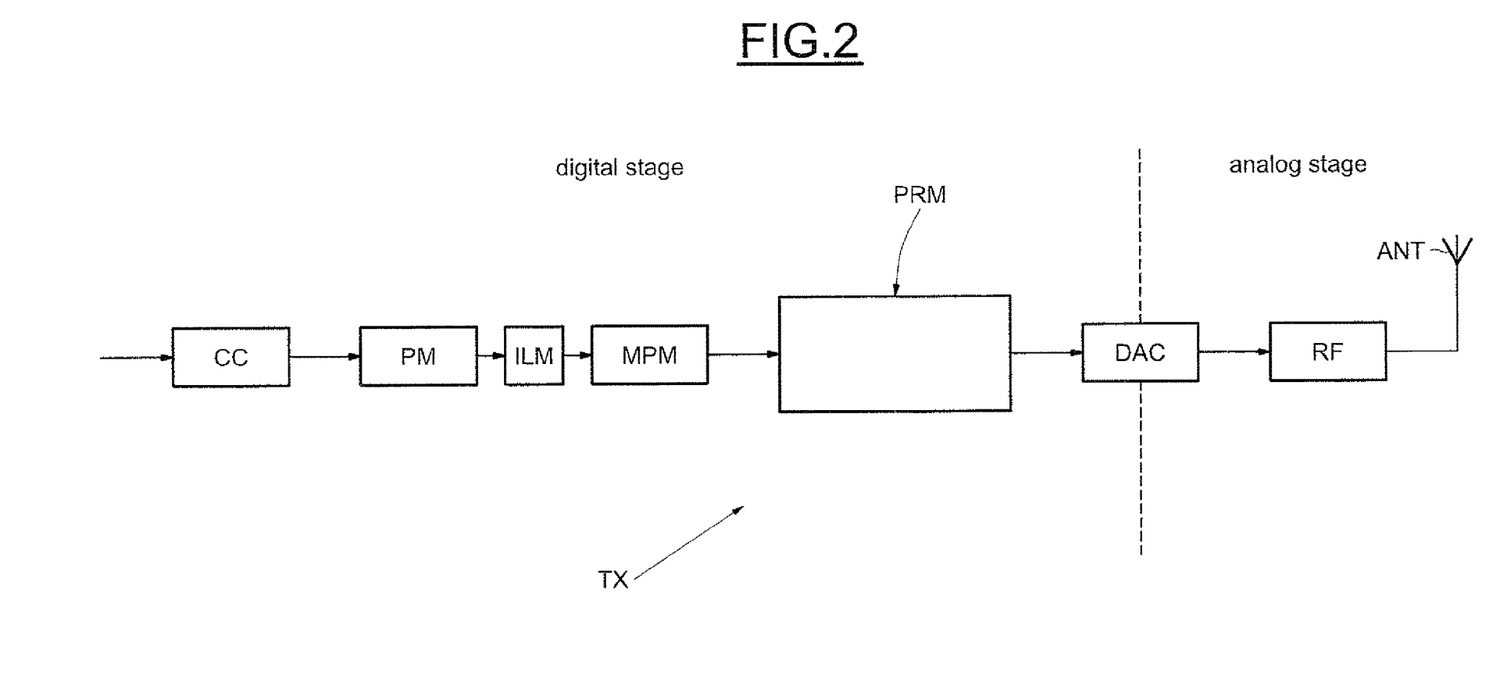
FIG. 2 is a block diagram illustrating a transmitter according to the present invention.

As depicted in FIG. 2, a transmitter TX comprises a digital baseband stage coupled to an analog radio frequency stage by a digital-to-analog conversion stage DAC. In a conventional manner, the transmission chain comprises an encoder CC, for example, a convolutional encoder, receiving data from source coding means or coder, and delivering a bits stream to puncturing means or circuit PM that delivers a punctured bits stream.

Interleaving means or circuit ILM are connected to the output of the puncturing circuit and are followed by mapping means or circuit MPM that maps the bits into symbols according to a modulation mapping scheme depending on the kind of modulation used, for example, a BPSK modulation or more generally a QAM modulation.

The successive symbols delivered by the mapping circuit MPM are MB-OFDM digital baseband symbols. Each symbol is a group containing 128 modulation coefficients respectively associated to 128 sub-carriers to be modulated accordingly. Of course, a group of 128 samples (modulation coefficients) is delivered on the I branch whereas another corresponding group of 128 samples is delivered on the Q branch.

These successive frequency-domain groups of digital modulation coefficients are then processed in processing means or a processor PRM that are adapted to remove sub-carriers within a part of the transmission band to be notched, as well as other chosen sub-carriers among the remaining ones.

The means or circuits belonging to the digital baseband stage may be realized, for example, by software within a microprocessor. Another possibility would include realizing at least some of these means or circuits, for example, IFFT or FFT, by specific ASICs.

The time-domain symbols delivered by the processor PRM are then processed in a conventional radio frequency stage RE after having been converted into the DAC stage, and before being transmitted on air through an antenna ANT.

Figure 3:
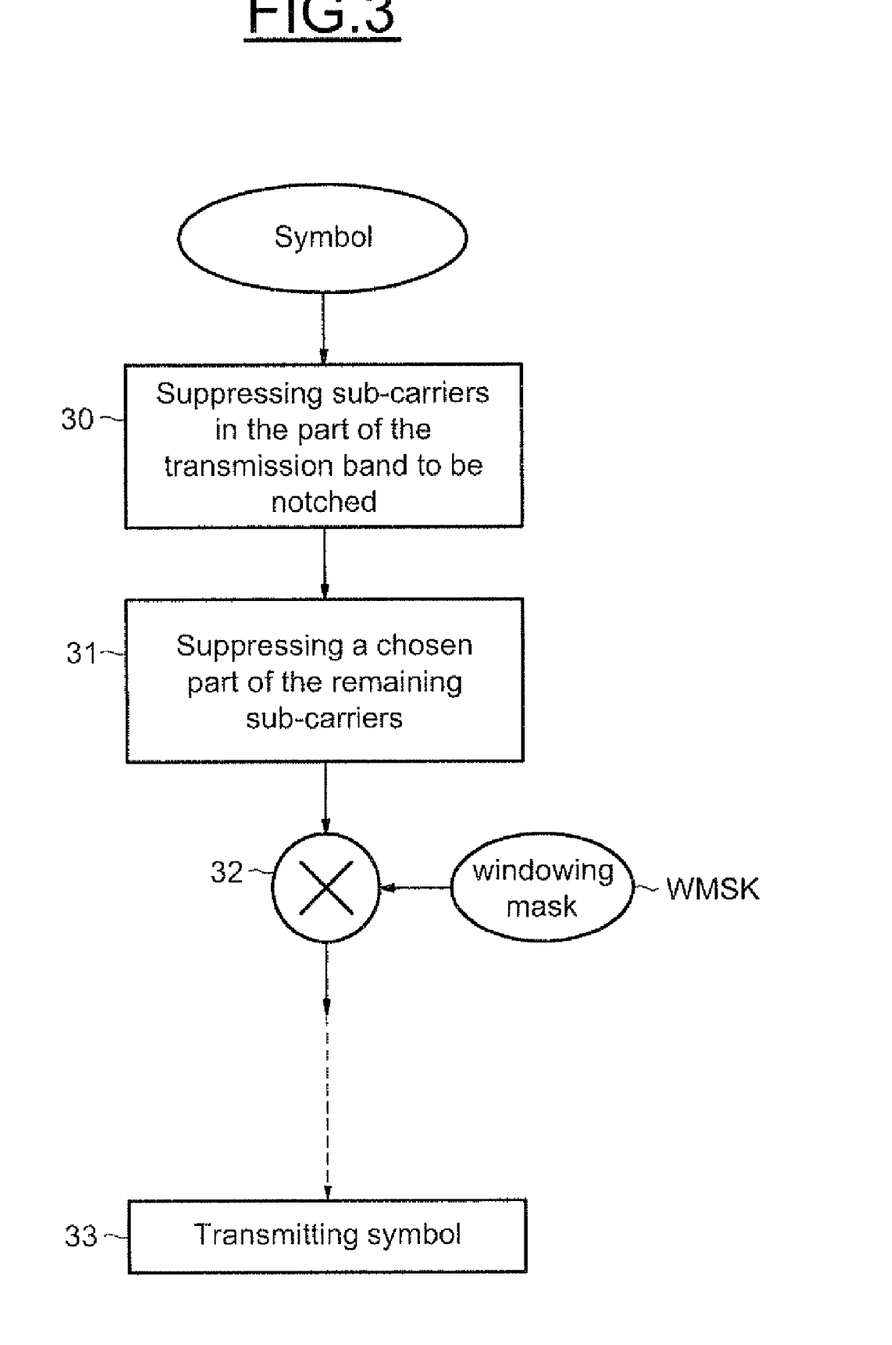
FIG. 3 is a flow chart illustrating a method according to the present invention.

An embodiment of the method is depicted in FIG. 3. More precisely, in each symbol, the sub-carriers corresponding to the part of the transmission band to be notched are suppressed (step 30). The desired band to be notched, for example, all frequencies between sub-carriers S1 and S2, can be easily notched, for example, by setting the corresponding modulation coefficients to zero. To have a deeper notch, while preserving the orthogonality of the remaining sub-carriers, a step 31 is performed which comprises suppressing a chosen part of the remaining sub-carriers, i.e., the sub-carriers of the symbol which have not been suppressed in step 30.

This further removal of a chosen part of the remaining sub-carriers, performed in step 31, can be also performed, for example, by setting the corresponding modulation coefficients to zero. To have again a deeper notch, it is proposed to multiply (step 32) the symbol obtained after step 31 by a windowing mask WMSK that is configured to keep the orthogonality between the sub-carriers to be transmitted, and to decrease the side-lobes power of the sub-carriers to be transmitted. The time-domain resulting symbol is thus transmitted (step 33) after having being processed, in particular, in the RF stage.

Figure 4:
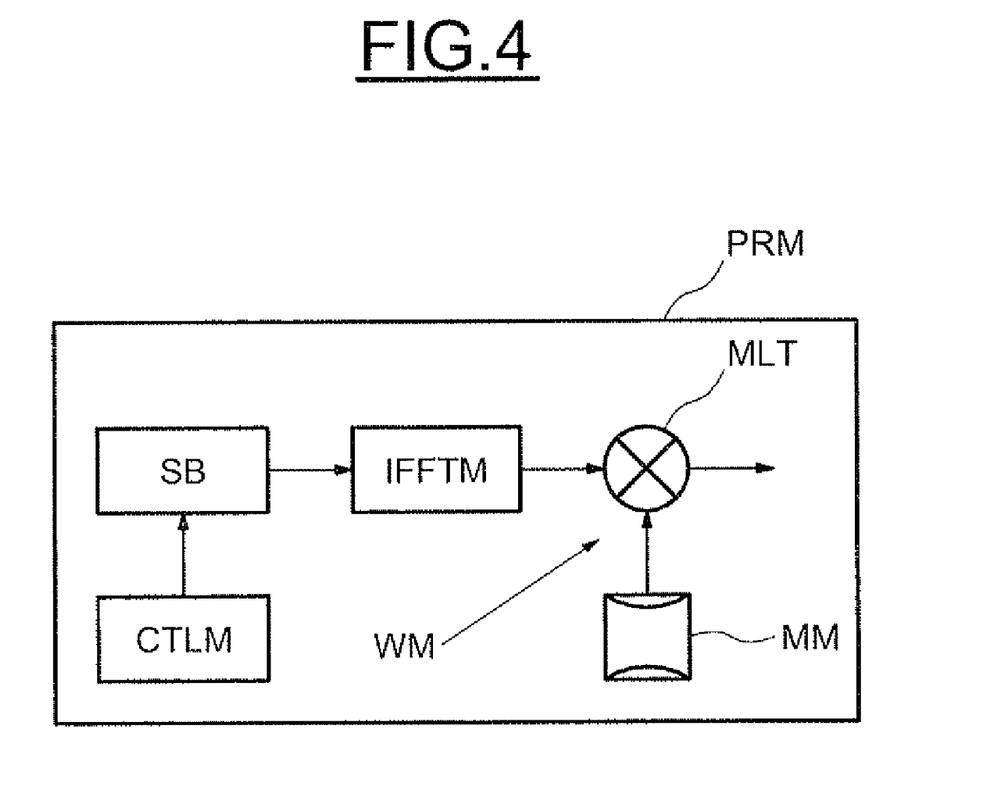
FIG. 4 is block diagram illustrating in greater detail a processor within a transmitter according to the present invention.

An example of a processor PRM configured to perform a processing such as the one depicted in FIG. 3 is depicted in FIG. 4. More precisely, the processor PRM comprises a suppression block SB controlled by control means or a controller CTLM. This suppression block SB is configured to first remove in each symbol, the sub-carriers within the part of the transmission band to be notched. As explained above, this removal can easily be performed by setting to zero the corresponding modulation coefficients associated to these sub-carriers.

Once these sub-carriers have been suppressed, the suppression block SB is also configured, upon the control of the controller CTLM, to suppress another chosen part of the remaining sub-carriers. Again, these chosen remaining sub-carriers to be further suppressed can actually be suppressed by setting to zero the corresponding modulation coefficients.

After that, the resulting symbol is processed in a frequency-domain to time-domain conversion processing means or processor IFFTM, for performing a discrete inverse fast Fourier transform.

The processor PRM may further comprise windowing means or circuit WM including a memory MM containing mask coefficients of the windowing mask WMSK, and multiplying means or multiplier MLT configured to multiply in the time-domain the symbols delivered by the IFFTM processor by the mask coefficients.

In order to have, in particular, a good homogeneity in the removal of the chosen sub-carriers, it is advantageous to keep in each symbol one remaining sub-carrier every n remaining sub-carriers, with n being an integer, for example, smaller than 5, and to suppress all the other remaining sub-carriers of the symbol. To minimize or reduce the loss of information, n may be equal to 2. In other words, in such a case, step 31 comprises suppressing in each symbol every other remaining sub-carrier.

Figure 5:
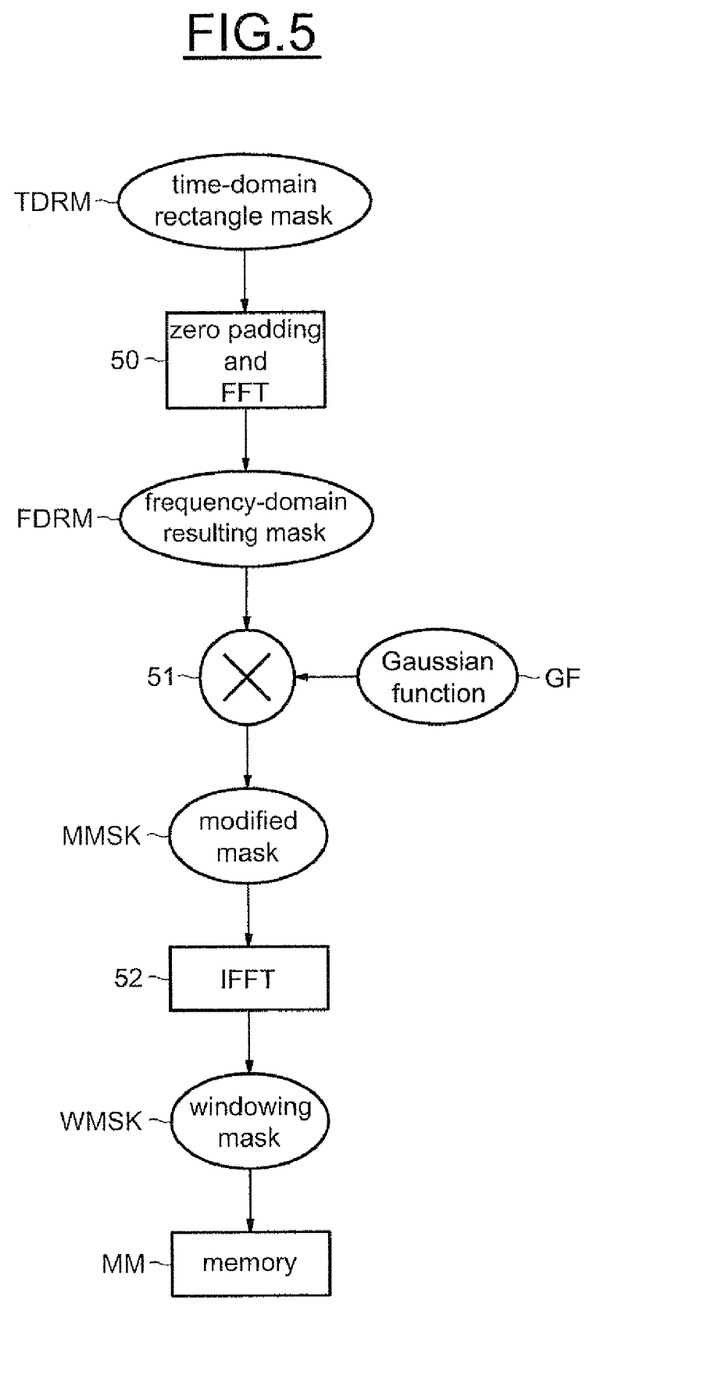
FIG. 5 is a flow chart illustrating an elaborating process of a windowing mask according to the present invention.

The windowing mask WMSK may be elaborated from a rectangle mask TDRM (FIG. 5) and a Gaussian function GF. However, other initial functions are possible. As depicted in FIG. 5, elaborating the time-domain windowing mask comprises, in a particular embodiment, providing a time-domain rectangle mask TDRM having a length equal to one $n^{th}$ of the length L of a symbol. Such a length of the time-domain rectangle mask is thus coherent with keeping in each symbol one remaining sub-carrier every n remaining sub-carriers. As a matter of fact, this will permit preservation, in particular, of the orthogonallity between the sub-carriers that will be actually transmitted through the antenna.

An aim of the initial rectangle function or mask having a length equal to L/n (L/n samples different from zero) is to obtain the sin c function (sin x/x) in the frequency domain with zeros located every L/n samples.

Then, elaborating the windowing mask comprises zero-padding the time-domain rectangle mask TDRM to reach an initial time-domain mask having a length equal to the length of a symbol, and performing a time-domain to frequency-domain conversion processing of the initial time-domain mask to obtain a frequency-domain resulting mask FDRM. The time-domain to frequency-domain conversion processing is, for example, a discrete direct fast Fourier transform FFT.

The resulting mask FDRM is then multiplied (step 51) by a Gaussian function GF for obtaining a modified mask MMSK. This permits a decrease in the levels of the secondary lobes. However, other functions not necessarily Gaussian functions, for example, triangular functions, may be used for decreasing the levels of the secondary lobes.

A frequency-domain to time-domain conversion processing, for example, an IFFT processing, is then performed in step 52 on the modified mask MMSK for obtaining the windowing mask WMSK.

Figure 6:
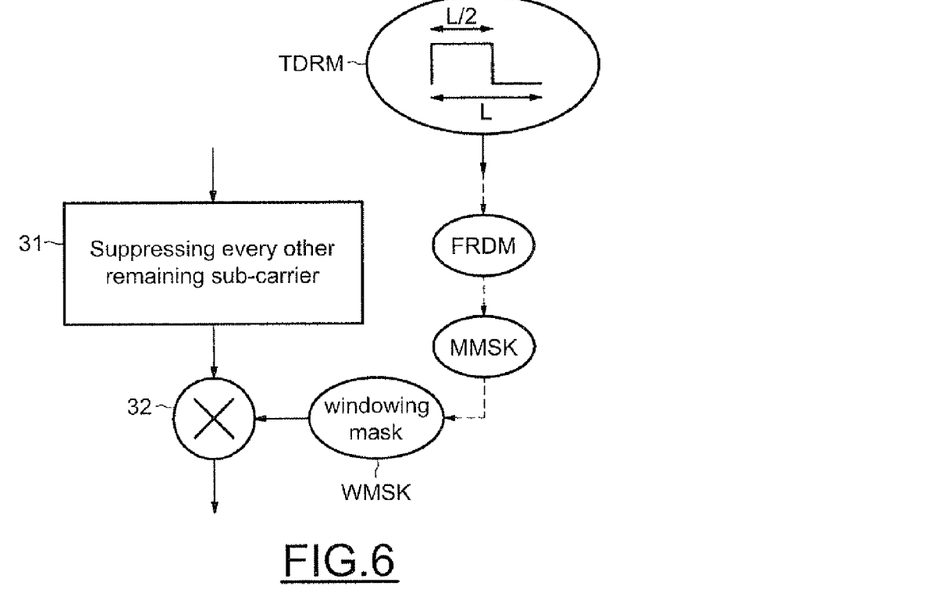
FIGS. 6 and 7 are flow charts illustrating various variations of the present invention.

The coefficients of the windowing mask WMSK are then stored in the memory MM. As explained above and depicted in greater detail in FIG. 6, when only every other remaining sub-carrier is suppressed in step 31, the time-domain rectangle mask TDRM has a length equal to L/2, with L being the length of the symbol. In an MB-OFDM application, L equals to 128.

While, as previously mentioned, a goal of the windowing mask applied in the time-domain to the OFDM symbol is to reduce the power of the transmitted carrier side-lobes, the windowing mask may be designed, for example, as follows.

Define a rectangle function of 64 samples (TDRM), then zero-pad it with 64 zeros to reach a total window length of 128 samples, and compute the Fourier transform of this 128 samples window. Multiply the obtained frequency-domain function by:

$$w[n] = e^{-\frac{1}{2}\left(\alpha \frac{n-\frac{N}{2}}{N/2}\right)^2}$$

where $0 \leq n < 128$, N=128, and particularly appropriate (but not exclusively) α coefficients are within the range [15,65].

Figure 8:
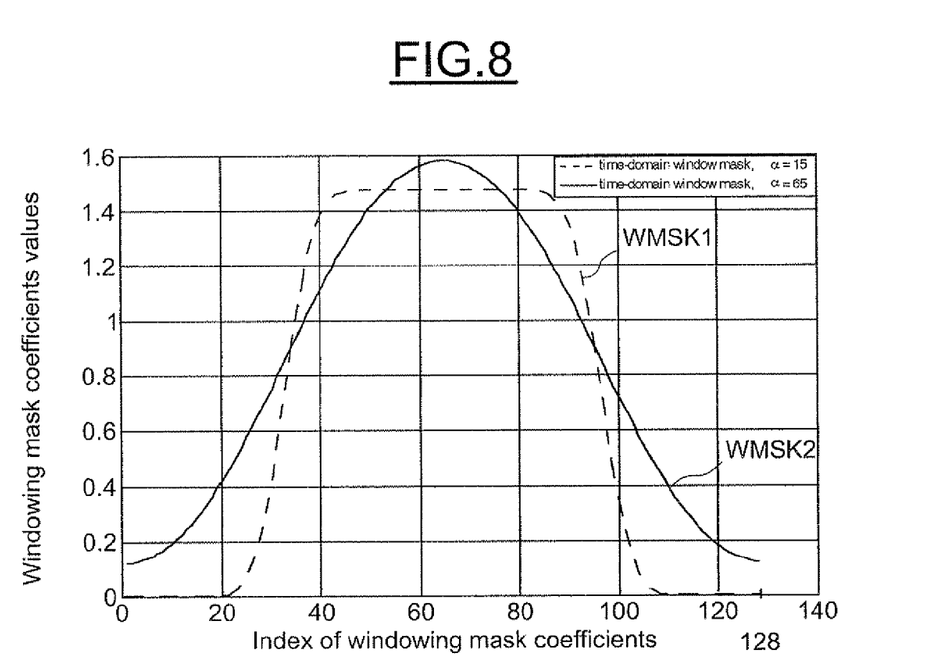
FIG. 8 is a graph illustrating examples of a windowing mask according to the present invention.

The inverse Fourier transform of the resulting function provides the time-domain window mask WMSK. Two examples of windowing masks WMSK1 and WMSK2 are depicted in FIG. 8. The windowing mask WMSK1 is obtained with α=15 while the mask WMSK2 is obtained with α=65. Lower values of α give deeper notches but the notch edge power attenuation decreases slower. Higher values of α yield give less deep notches, but the notch edge is sharper and the attenuation level is reached faster. Orthogonality is preserved despite windowing because in the present example, only every other sub-carrier is transmitted.

Figure 9:
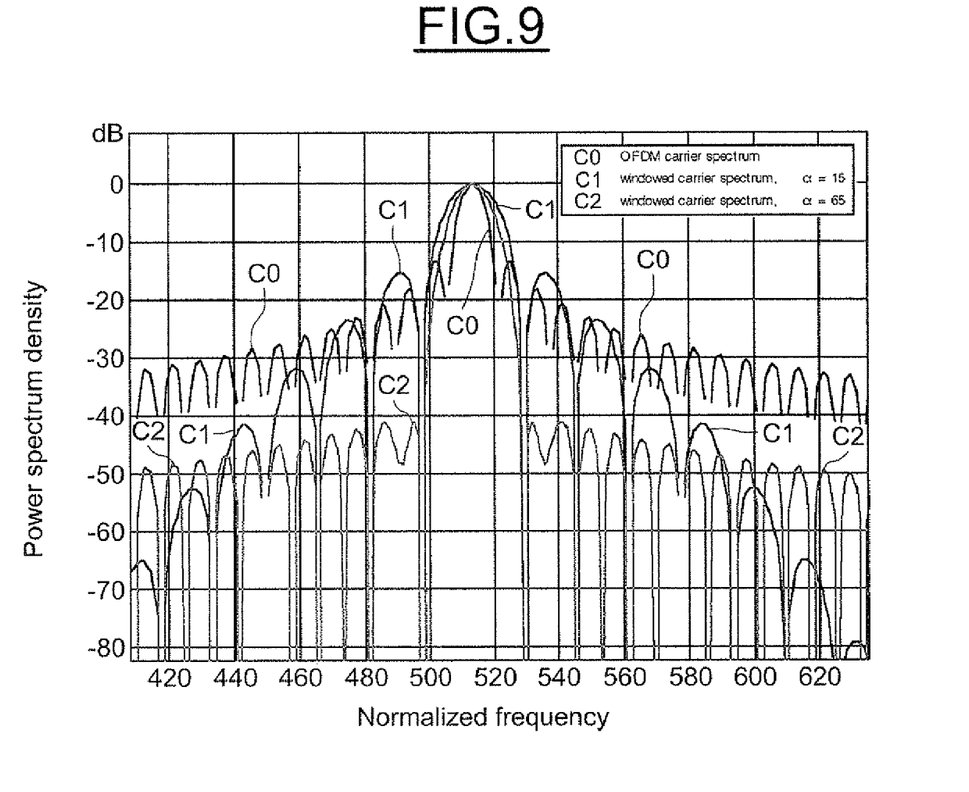
FIGS. 9 and 10 are graphs illustrating example embodiments of a method according to the present invention.

The increased attenuation of the windowed sub-carrier side-lobes, with respect to the lobes of conventional OFDM carriers, can be observed in FIG. 9, in which C0 designates the OFDM carrier spectrum, C1 designates the windowed carrier spectrum with $\alpha=15$, and C2 designates the windowed carrier spectrum with $\alpha=65$. As can be noticed in FIG. 9, windowed sub-carriers are orthogonal only every other sub-carrier in comparison to conventional OFDM sub-carriers.

Figure 10:
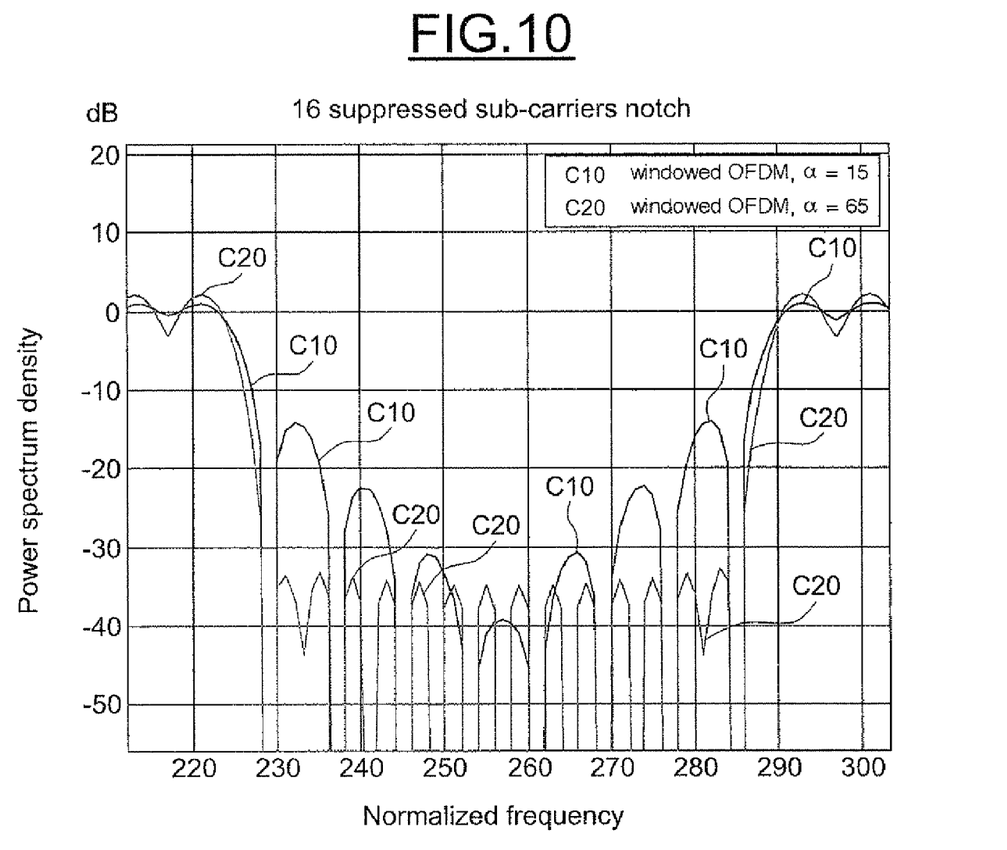

Further, notches of different characteristics according to the $\alpha$ parameter of the windowing mask are depicted in FIG. 10. In this figure, C10 designates the notch obtained with an $\alpha$ parameter equal to 15, whereas C20 designates the notch obtained with $\alpha=65$. Smaller $\alpha$ values lead to deeper notches, whereas larger $\alpha$ values give sharper notch edges. But, attenuation between 30 dB and more than 40 dB can be obtained.

Using, for example, only half of the sub-carriers leads to a loss of transmitted information. This can be acceptable in certain applications. But, such a loss of transmitted information does not have to be the case for all transmission rates, as explained in greater detail below.

Lower transmission rates, namely from 53.3 to 200 Mbs, use time spreading and/or frequency spreading to increase Signal-to-Noise Ratio (SNR) and frequency diversity gain. Both spreading types are based on a simple repetition of the transmitted data, respectively in frequency and time domains.

A WiMedia OFDM UWB symbol is on 128 carriers. Indexing sub-carriers from −64 to 63, frequency spreading is performed by sending twice the same data symbol x (at carrier n, and its complex conjugate x* at carrier −n). Therefore, in frequency-domain spreading modes, only half of the 128 carriers correspond to different data symbols. Spreading in the time domain is performed simply by repeating twice two consecutive OFDM symbols.

A regular WiMedia UWB receiver combines together data symbols, known to be repeated, to increase the SNR and frequency diversity of the received signal. For example, when a transmission mode uses both frequency and time-domain spreading, the data symbol x(k,n), with k being the OFDM symbol index and n the sub-carrier index, can be recovered in the following way.

After equalization (to compensate for channel distortion), we add together x(k,n) and x* (k,−n). Then we repeat the same procedure for the OFDM symbol k+1 and we finally add together results obtained from both symbols (sin ce they correspond to the same data symbol repeated twice).

Thus, in the case when suppression of half of the sub-carriers (even or odd) of the transmitted OFDM symbols is performed, the lost carriers can be recovered for applications using time-domain spreading. This is the case, in particular, for MB-OFDM transmission schemes when transmission rates are between 53.3 and 200 Mbs.

In such a case, we can simply recover the lost carriers by alternating the suppression of even and odd carriers in consecutive OFDM symbols. Thanks to the symbols repetition, suppressed sub-carriers from symbol k can be recovered from the repeated symbol k+1, where the suppressed sub-carriers change from even (respectively odd) to odd (respectively even).

Figure 7:
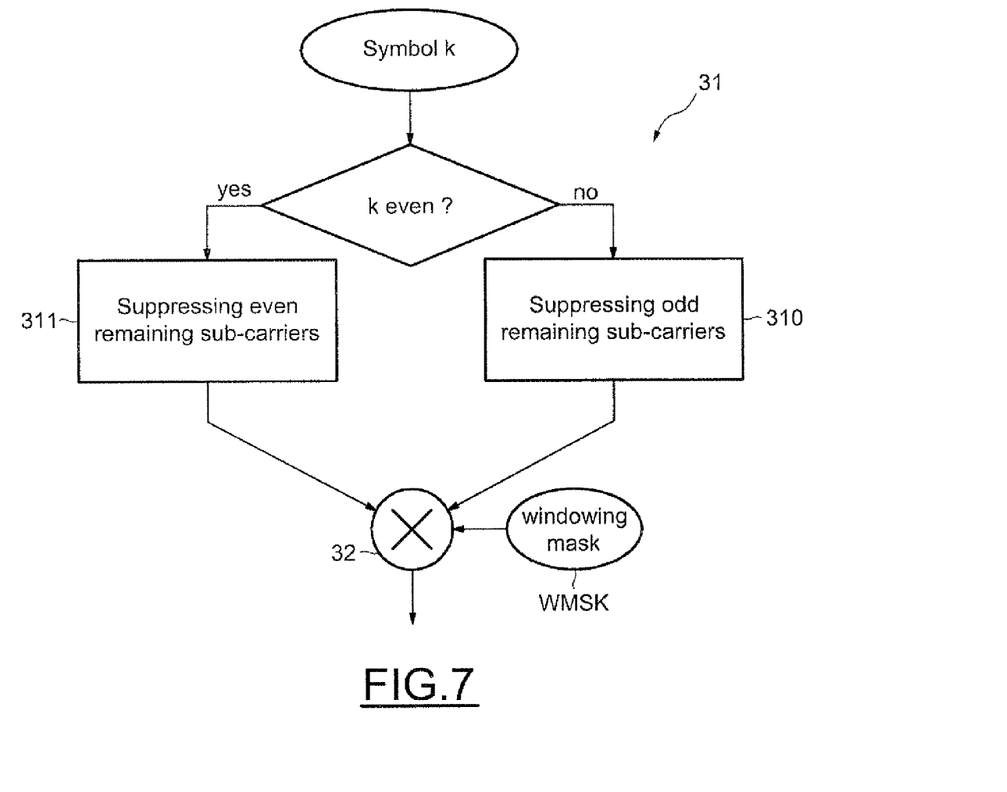

This particular embodiment is depicted in FIG. 7. If for example the symbol index k is even, the even remaining sub-carriers are suppressed (step 311), whereas the odd remaining sub-carriers are suppressed if k is odd. Of course, it is possible to replace even by odd in steps 311 and 310.

In transmission modes without time spreading (corresponding to data rates above 200 Mbs), it is not possible to recover the missing carriers. However, the use of the above described method is still possible, but with degraded performances which can nevertheless be acceptable depending on the application.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of notching a transmission band of a signal including successive symbols to be transmitted, with each symbol comprising sub-carriers to be modulated, the method comprising:
   suppressing in at least some of the symbols the sub-carriers corresponding to a part of the transmission band to be notched;
   suppressing in at least some of the symbols a chosen part of the remaining sub-carriers to be modulated; and
   multiplying in a time-domain the symbols by a windowing mask configured to keep orthogonality between the sub-carriers to be transmitted and to decrease side-lobe power of the sub-carriers to be transmitted, with the windowing mask being based on a rectangular mask multiplied by an auxiliary function.

2. The method according to claim 1, wherein suppressing in at least some of the symbols a chosen part of the remaining sub-carriers to be modulated comprises keeping in at least some of the symbols one remaining sub-carrier every n remaining sub-carriers, with n being an integer smaller than five and suppressing all other remaining sub-carriers of each symbol.

3. The method according to claim 1, wherein suppressing in at least some of the symbols a chosen part of the remaining sub-carriers to be modulated comprises suppressing half of the remaining sub-carriers in each symbol.

4. The method according to claim 3, wherein suppressing in at least some of the symbols half of the remaining sub-carriers comprises suppressing every other remaining sub-carrier.

5. The method according to claim 4, wherein suppressing in at least some of the symbols every other remaining sub-carrier comprises suppressing alternately even and odd remaining sub-carriers respectively in two successive symbols.

6. The method according to claim 1, wherein the auxiliary function is based on a Gaussian function.

7. The method according to claim 1, wherein suppressing in at least some of the symbols a chosen part of the remaining sub-carriers to be modulated comprises keeping in each symbol one remaining sub-carrier every n remaining sub-carriers, with n being an integer smaller than five and suppressing all other remaining sub-carriers of the symbol; and
   wherein elaborating the windowing mask comprises:
   providing a time-domain rectangle mask having a length equal to one nth of a length of a symbol;
   zero-padding the time domain rectangle mask to reach an initial time domain mask having a length equal to the length of a symbol;
   performing a time-domain to frequency-domain conversion processing of an initial time domain mask for obtaining a frequency-domain resulting mask;

multiplying the resulting mask with the auxiliary function for obtaining a modified mask; and performing a frequency-domain to time-domain conversion processing on the modified mask for obtaining the windowing mask.

8. The method according to claim 1, wherein the signal comprises an Ultra Wide Band (UWB) signal modulated according to a multiband Orthogonal Frequency-Division Multiplexing (MB-OFDM) modulation scheme.

9. A device for notching a transmission band of a signal including successive symbols to be transmitted, with each symbol comprising sub-carriers to be modulated, the device comprising:

a processor configured to suppress in at least some of the symbols the sub-carriers corresponding to a part of the transmission band to be notched;

said processor further configured
to suppress in at least some of the symbols a chosen part of the remaining sub-carriers to be modulated, and
to multiply in a time-domain the symbols by a windowing mask configured to keep orthogonality between the sub-carriers to be transmitted and to decrease sidelobe power of the sub-carriers to be transmitted, with the windowing mask being based on a rectangular mask multiplied by an auxiliary function.

10. The device according to claim 9, wherein said processor suppressing in at least some of the symbols a chosen part of the remaining sub-carriers to be modulated comprises keeping in each symbol one remaining sub-carrier every n remaining sub-carriers, with n being an integer smaller than five and suppressing all other remaining sub-carriers of the symbol.

11. The device according to claim 9, wherein said processor suppressing in at least some of the symbols a chosen part of the remaining sub-carriers to be modulated comprises suppressing half of the remaining sub-carriers in each symbol.

12. The device according to claim 11, wherein said processor suppressing in at least some of the symbols half of the remaining sub-carriers comprises suppressing every other remaining sub-carrier.

13. The device according to claim 12, wherein said processor suppressing in at least some of the symbols every other remaining sub-carrier comprises suppressing alternately even and odd remaining sub-carriers respectively in two successive symbols.

14. The device according to claim 9, wherein said processor further comprises:

a windowing circuit comprising a memory storing mask coefficients of the windowing mask; and
a multiplier configured to multiply in the time domain the symbols by the mask coefficients.

15. The device according to claim 9, wherein the signal comprises an Ultra Wide Band (UWB) signal modulated according to a multiband Orthogonal Frequency-Division Multiplexing (MB-OFDM) modulation scheme.

16. A transmitter comprising:

a digital baseband stage for notching a transmission band of a digital signal including successive symbols to be transmitted, with each symbol comprising sub-carriers to be modulated, said digital baseband stage comprising:

a processor configured to suppress in at least some of the symbols the sub-carriers corresponding to a part of the transmission band to be notched, said processor further configured
to suppress in at least some of the symbols a chosen part of the remaining sub-carriers to be modulated, and
to multiply in a time-domain the symbols by a windowing mask configured to keep orthogonality between the sub-carriers to be transmitted and to decrease sidelobe power of the sub-carriers to be transmitted, with the windowing mask being based on a rectangular mask multiplied by an auxiliary function; and a digital-to-analog conversion stage downstream from said digital baseband stage for converting the notched transmission band of the digital signal to an analog signal; and an analog radio frequency stage downstream from digital-to-analog conversion stage for transmitting the notched transmission band of the analog signal.

17. The transmitter according to claim 16, wherein said processor suppressing in at least some of the symbols a chosen part of the remaining sub-carriers to be modulated comprises keeping in each symbol one remaining sub-carrier every n remaining sub-carriers, with n being an integer smaller than five and suppressing all other remaining sub-carriers of the symbol.

18. The transmitter according to claim 16, wherein said processor suppressing in at least some of the symbols a chosen part of the remaining sub-carriers to be modulated comprises suppressing half of the remaining sub-carriers in each symbol.

19. The transmitter according to claim 18, wherein said processor suppressing in at least some of the symbols half of the remaining sub-carriers comprises suppressing every other remaining sub-carrier.

20. The transmitter according to claim 19, wherein said processor suppressing in at least some of the symbols every other remaining sub-carrier comprises suppressing alternately even and odd remaining sub-carriers respectively in two successive symbols.

21. The transmitter according to claim 16, wherein said processor further comprises:

a windowing circuit comprising a memory storing mask coefficients of the windowing mask; and
a multiplier configured to multiply in the time domain the symbols by the mask coefficients.

22. The transmitter according to claim 16, wherein the signal comprises an Ultra Wide Band (UWB) signal modulated according to a multiband Orthogonal Frequency-Division Multiplexing (MB-OFDM) modulation scheme.

* * * * *